(12) United States Patent
Matsumura et al.

(10) Patent No.: US 12,267,134 B2
(45) Date of Patent: Apr. 1, 2025

(54) TERMINAL, RADIO COMMUNICATION METHOD, BASE STATION, AND SYSTEM

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/744,169

(22) Filed: Jun. 14, 2024

(65) Prior Publication Data

US 2024/0333357 A1 Oct. 3, 2024

Related U.S. Application Data

(63) Continuation of application No. 17/995,233, filed as application No. PCT/JP2020/015360 on Apr. 3, 2020, now abandoned.

(51) Int. Cl.
 *H04B 7/06* (2006.01)
(52) U.S. Cl.
 CPC ........... *H04B 7/0626* (2013.01); *H04B 7/063* (2013.01)
(58) Field of Classification Search
 CPC .. H04B 7/0456; H04B 7/0626; H04B 7/0628; H04B 7/063; H04W 16/28; H04W 24/10; H04W 88/02
 See application file for complete search history.

(56) References Cited

U.S. PATENT DOCUMENTS

| | | |
|---|---|---|
| 2017/0078065 A1 | 3/2017 | Nam et al. |
| 2019/0109626 A1 | 4/2019 | Park et al. |
| 2020/0245333 A1* | 7/2020 | Lin ...................... H04L 1/0026 |
| 2021/0111768 A1* | 4/2021 | Hugl ................... H04B 7/0452 |
| 2023/0087003 A1 | 3/2023 | Hao et al. |

FOREIGN PATENT DOCUMENTS

CN 115053468 A 9/2022

OTHER PUBLICATIONS

International Search Report issued in PCT/JP2020/015360, mailed on Jul. 14, 2020 (6 pages).

(Continued)

*Primary Examiner* — David B Lugo
(74) *Attorney, Agent, or Firm* — Osha Bergman Watanabe & Burton LLP

(57) ABSTRACT

A terminal, as disclosed, includes: a processor that, for a plurality of physical downlink shared channels (PDSCHs) transmitted from a plurality of transmission reception points (TRPs), respectively, controls transmission of capability information for indicating a first maximum number regarding a number of layers per PDSCH and a second maximum number regarding a total number of layers of the plurality of PDSCHS; and a receiver that receives the plurality of PDSCHs. The processor controls reporting of a single channel state information (CSI) for the plurality of TRPs, the single CSI indicating a first rank and a second rank that are determined according to a set of ranks based on higher layer signaling. In other aspects, a radio communication method, a base station, and a system are also disclosed.

4 Claims, 13 Drawing Sheets

(56) References Cited

OTHER PUBLICATIONS

Written Opinion of the International Searching Authority issued in PCT/JP2020/015360, mailed on Jul. 14, 2020 (3 pages).
NEC; "Discussion on feedback for multi-TRP transmission"; 3GPP TSG RAN WG1 #97, R1-1906401; Reno, USA, May 13-17, 2019 (3 pages).
Huawei, HiSilicon; "CSI measurement enhancement for multi-TRP/panel transmission"; 3GPP TSG RAN WG1 #97, R1-1906038; Reno, USA, May 13-17, 2019 (5 pages).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).
3GPP TSG RAN WG1 #100-e; R1-2001484 "RAN1 UE features list for Rel-16 NR after RAN1#100-E" At&T, NTT DOCOMO, Inc.; e-Meeting, Feb. 24-Mar. 6, 2020 (262 pages).
3GPP TSG-RAN WG1 Meeting #98; R1-1909272 "Multi-TRP Enhancements" Qualcomm Incorporated; Prague, Czech Republic; Aug. 26-30, 2019 (32 pages).
Office Action issued in Japanese Application No. 2022-511487; Dated Mar. 19, 2024 (8 pages).
Office Action issued in Chinese Patent Application No. 202080101346.4, mailed on Oct. 31, 2024 (19 pages).

* cited by examiner

TERMINAL, RADIO COMMUNICATION METHOD, BASE STATION, AND SYSTEM

CROSS-REFERENCE TO RELATED APPLICATIONS

This application is a continuation application and, thereby, claims benefit under 35 U.S.C. § 120 to U.S. patent application Ser. No. 17/995,233, filed on Sep. 30, 2022, titled "TERMINAL, RADIO COMMUNICATION METHOD, AND BASE STATION," which is a national stage application of PCT Application No. PCT/JP2020/015360, filed on Apr. 3, 2020. The contents of these applications are incorporated by reference in their entirety.

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, a scheme in which one or a plurality of transmission/reception points (TRPs) (multi TRP) perform DL transmission (for example, PDSCH transmission) to a user terminal (User Equipment (UE)) by using one or a plurality of panels (multi panel) has been under study.

However, in NR specifications defined thus far such as Rel. 15, the multi panel/TRP is not taken into consideration, and accordingly how to perform measurement and report of CSI of a case in which the multi panel/TRP is used has not yet been clarified. Unless measurement and report of CSI is appropriately performed, system performance may be deteriorated, e.g., throughput may be reduced.

In view of this, the present disclosure has one object to provide a terminal, a radio communication method, and a base station that appropriately perform measurement and report of CSI for a multi panel/TRP.

Solution to Problem

A terminal according to an aspect of the present disclosure includes a control section that assumes that a first rank indicated by first channel state information (CSI) and a second rank indicated by second CSI are subjected to a given restriction, and controls creation of a joint CSI report including the first CSI and the second CSI, and a transmitting section that transmits the joint CSI report.

Advantageous Effects of Invention

According to an aspect of the present disclosure, measurement and report of CSI for a multi panel/TRP can be appropriately performed.

Figure 1:
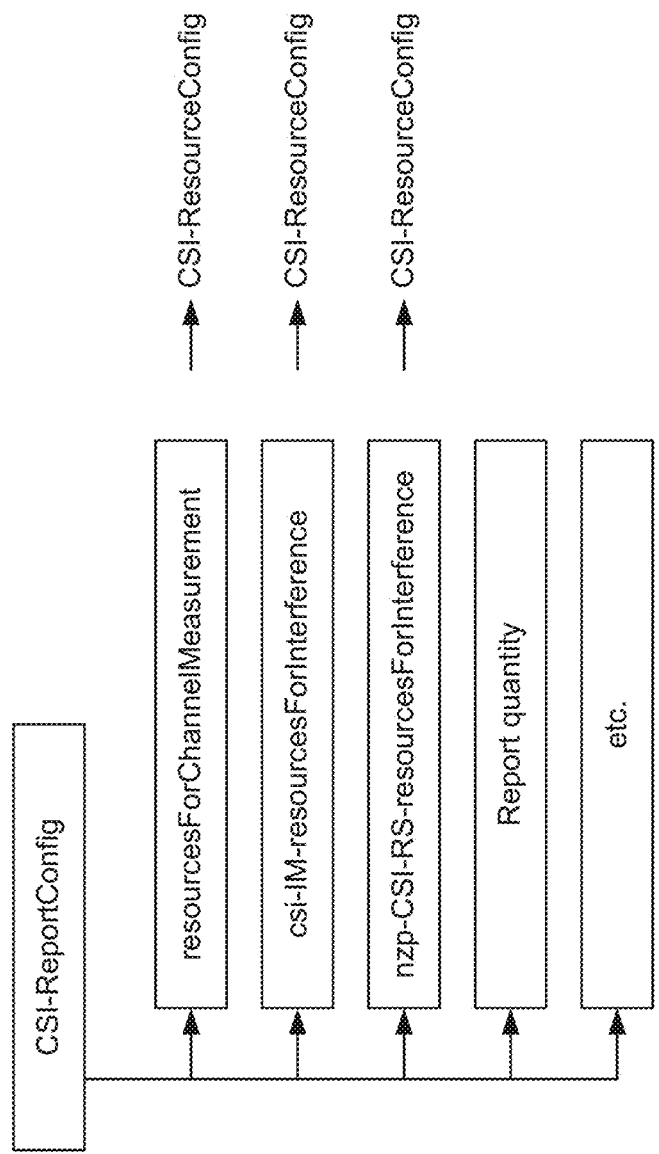
FIG. 1 is a diagram to show an example of a CSI report configuration in Rel-15 NR.

DESCRIPTION OF EMBODIMENTS (CSI Report (or Reporting))

In Rel-15 NR, a terminal (also referred to as a user terminal, a User Equipment (UE), or the like) generates (also described as determines, calculates, estimates, measures, or the like) channel state information (CSI), based on a reference signal (RS) (or a resource for the RS), and transmits (also described as reports, feeds back, or the like) the generated CSI to a network (for example, a base station). The CSI may be, for example, transmitted to the base station by using an uplink control channel (for example, a Physical Uplink Control Channel (PUCCH)) or an uplink shared channel (for example, a Physical Uplink Shared Channel (PUSCH)).

The RS used for generation of the CSI may be, for example, at least one of a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), and the like.

The CSI-RS may include at least one of a non-zero power (NZP) CSI-RS and CSI-Interference Management (CSI-IM). The SS/PBCH block is a block including the SS and the PBCH (and a corresponding DMRS), and may be referred to as an SS block (SSB) or the like. The SS may include at least one of a primary synchronization signal (PSS) and a secondary synchronization signal (SSS).

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP (reference signal received power in layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

The UE may receive information (report configuration information) related to a CSI report, and control the CSI report, based on the report configuration information. The report configuration information may be, for example, a radio resource control (RRC) information element (IE) "CSI-ReportConfig". Note that, in the present disclosure, the RRC IE may be interchangeably interpreted as an RRC parameter, a higher layer parameter, or the like.

The report configuration information (for example, the RRC IE "CSI-ReportConfig") may include at least one of the following, for example.

Information (report type information, for example, an RRC IE "reportConfigType") related to a type of the CSI report Information (report quantity information, for example, an RRC IE "reportQuantity") related to one or more quantities (one or more CSI parameters) of the CSI to be reported Information (resource information, for example, an RRC IE "CSI-ResourceConfigId") related to the resource for the RS used for generation of the quantity (the CSI parameter)

Information (frequency domain information, for example, an RRC IE "reportFreqConfiguration") related to the frequency domain being a target of the CSI report For example, the report type information may indicate a periodic CSI (P-CSI) report, an aperiodic CSI (A-CSI) report, or a semi-persistent CSI report (Semi-Persistent CSI (SP-CSI)) report.

The report quantity information may specify at least one combination of the CSI parameters (for example, the CRI, the RI, the PMI, the CQI, the LI, the L1-RSRP, and the like).

The resource information may be an ID of the resource for the RS. The resource for the RS may include, for example, a non-zero power CSI-RS resource or SSB, and a CSI-IM resource (for example, a zero power CSI-RS resource).

The frequency domain information may indicate frequency granularity of the CSI report. The frequency granularity may include, for example, a wideband and a subband. The wideband is an entire CSI reporting band. The wideband may be, for example, an entire given carrier (component carrier (CC), cell, serving cell), or may be an entire bandwidth part (BWP) in a given carrier. The wideband may be interpreted as a CSI reporting band, an entire CSI reporting band, or the like.

The subband is a part of the wideband, and may include one or more resource blocks (RBs) (or physical resource blocks (PRBs)). The size of the subband may be determined depending on the size of the BWP (number of PRBs).

The frequency domain information may indicate which of the PMI of the wideband or of the subband is to be reported (the frequency domain information may include, for example, an RRC IE "pmi-FormatIndicator" used for determining any of a wideband PMI report and a subband PMI report). The UE may determine frequency granularity of the CSI report (in other words, any of the wideband PMI report and the subband PMI report), based on at least one of the report quantity information and the frequency domain information.

When the wideband PMI report is configured (determined), one wideband PMI may be reported for the entire CSI reporting band. In contrast, when the subband PMI report is configured, a single wideband indication $i_1$ is reported for the entire CSI reporting band, and subband indication (one subband indication) $i_2$ of each of one or more subbands (for example, the subband indication of each subband) in the entire CSI report may be reported.

The UE performs channel estimation by using a received RS, and estimates a channel matrix H. The UE feeds back an index (PMI) that is determined based on the estimated channel matrix.

The PMI may indicate a precoder matrix (also simply referred to as a precoder) that the UE considers appropriate for the use for downlink (DL) transmission to the UE. Each value of the PMI may correspond to one precoder matrix. A set of values of the PMI may correspond to a different set of precoder matrices referred to as a precoder codebook (also simply referred to as a codebook).

In the space domain, the CSI report may include one or more types of CSI. For example, the CSI may include at least one of a first type (type 1 CSI) that is used for selection of a single beam and a second type (type 2 CSI) that is used for selection of a multi beam. The single beam may be interpreted as a single layer, and the multi beam may be interpreted as a plurality of beams. The type 1 CSI may not assume multi user multiple input multiple output (MIMO), and the type 2 CSI may assume multi user MIMO.

The codebook may include a codebook for the type 1 CSI (also referred to as a type 1 codebook or the like) and a codebook for the type 2 CSI (also referred to as a type 2 codebook or the like). The type 1 CSI may include type 1 single panel CSI and type 1 multi panel CSI, and different codebooks (type 1 single panel codebook, type 1 multi panel codebook) may be respectively defined.

In the present disclosure, "type 1" and "type I" may be interchangeably interpreted as each other. In the present disclosure, "type 2" and "type II" may be interchangeably interpreted as each other.

Uplink control information (UCI) types may include at least one of a Hybrid Automatic Repeat reQuest ACKnowledgement (HARQ-ACK), a scheduling request (SR), and CSI. The UCI may be carried on the PUCCH, or may be carried on the PUSCH.

In Rel-15 NR, the UCI can include one CSI part for wideband PMI feedback. CSI report #n includes PMI wideband information if being reported.

In Rel-15 NR, the UCI can include two CSI parts for subband PMI feedback. CSI part 1 includes wideband PMI information. CSI part 2 includes one piece of wideband PMI information and some pieces of subband PMI information. The CSI part 1 and the CSI part 2 are separately coded.

In Rel-15 NR, the UE is configured with report setting of N (N≥1) CSI report configurations and resource setting of M (M≥1) CSI resource configurations by a higher layer. For example, as shown in FIG. 1, the CSI report configuration (CSI-ReportConfig) includes resource setting for channel measurement (resourcesForChannelMeasurement), CSI-IM resource setting for interference (csi-IM-ResourceForInterference), NZP-CSI-RS setting for interference (nzp-CSI-RS-ResourceForInterference), report quantity (reportQuantity), and the like. Each of the resource setting for channel measurement, the CSI-IM resource setting for interference, and the NZP-CSI-RS setting for interference is associated with the CSI resource configuration (CSI-ResourceConfig, CSI-ResourceConfigId). The CSI resource configuration includes a list of CSI-RS resource sets (csi-RS-ResourceSetList, for example, an NZP-CSI-RS resource set or a CSI-IM resource set).

If interference measurement is performed in the CSI-IM, each CSI-RS resource for channel measurement is associated with the CSI-IM resource for each resource in order of the CSI-RS resource and the CSI-IM resource in a corresponding resource set. The number of CSI-RS resources for channel measurement is equal to the number of CSI-IM resources.

In other words, for the interference measurement based on the CSI-IM, channel measurement resources (CMRs) and interference measurement resources (IMRs) are mapped on a one-to-one basis.

If the UE is configured with the CSI report configuration including the report quantity (higher layer parameter reportQuantity) set to 'cri-RSRP', 'cri-RI-PMI-CQI', 'cri-RI-i1', 'cri-RI-i1-CQI', 'cri-RI-CQI', or 'cri-RI-LI-PMI-CQI' and $K_S$ ($K_S$>1) resources are configured in a corresponding resource set for channel measurement, the UE derives CSI parameters other than the CRI with a reported CRI being a condition. CSI k (k≥0) corresponds to a (k+1)-th configured entry of an associated NZP-CSI-RS resource (nzp-CSI-RSResource) in a corresponding NZP-CSI-RS resource set (nzp-CSI-RS-ResourceSet) for channel measurement and a (k+1)-th configured entry of an associated CSI-IM resource (csi-IM-Resource) in a CSI-IM resource set (csi-IM-ResourceSet) if being configured.

In other words, CSI k corresponds to a (k+1)-th configured CMR and a (k+1)-th configured IMR.

For both of FR1 and FR2, in order to enable more dynamic channel/interference hypotheses for NCJT, evaluation and definition of the CSI report for transmission of at least one of the multi TRP and the multi panel of the DL have been under study.

(Multi TRP)

For NR, a scheme in which one or a plurality of transmission/reception points (TRPs) (multi TRP (MTRP)) perform DL transmission to the UE by using one or a plurality of panels (multi panel) has been under study. In addition, a scheme in which the UE performs UL transmission to one or a plurality of TRPs by using one or a plurality of panels has been under study.

Note that the plurality of TRPs may correspond to the same cell identifier (ID), or may correspond to different cell IDs. The cell ID may be a physical cell ID, or may be a virtual cell ID.

Figure 2:
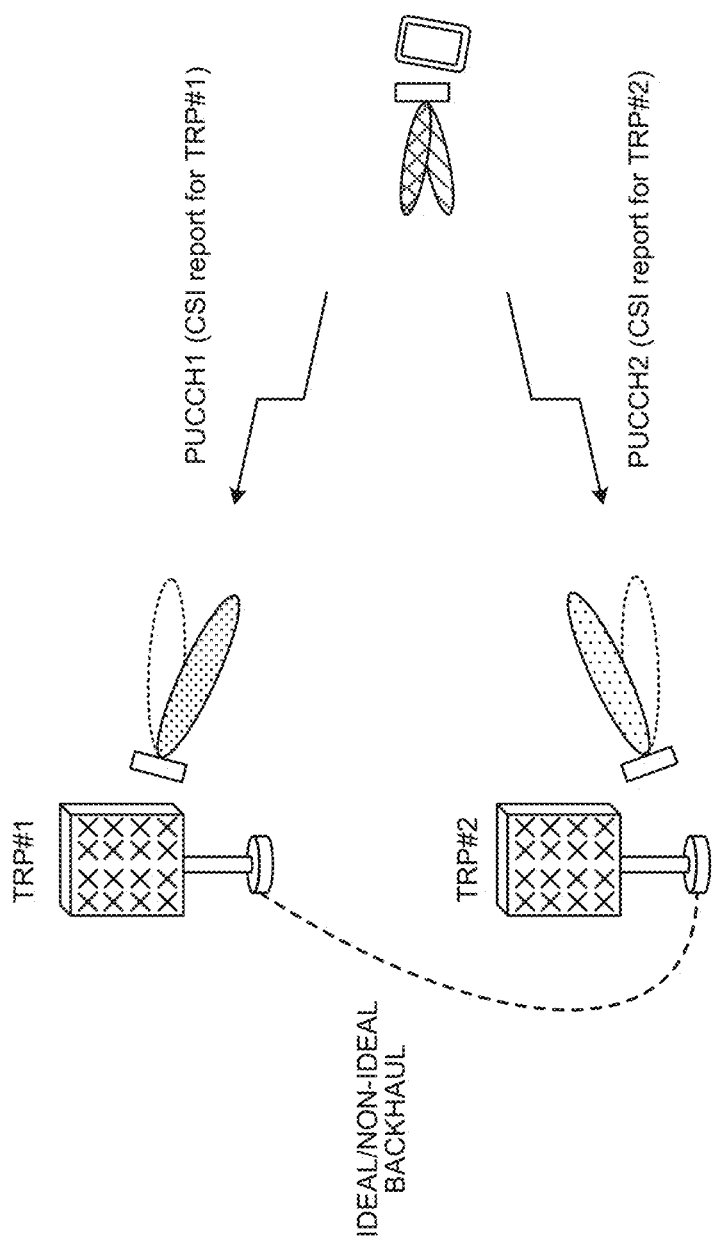
FIG. 2 is a diagram to show an example of a multi TRP scenario.

FIG. 2 is a diagram to show an example of a multi TRP scenario. In these examples, each TRP and the UE assume that two different beams can be used. However, this is not restrictive.

The multi TRP (TRPs #1 and #2) are connected with an ideal/non-ideal backhaul, and information, data, and the like may be exchanged therebetween. Different code words (CWs) and different layers may be transmitted from each TRP of the multi TRP. As one mode of multi TRP transmission, non-coherent joint transmission (NCJT) may be used.

In NCJT, for example, a TRP1 performs modulation mapping of a first code word and performs layer mapping so as to transmit a first PDSCH by using first precoding for a first number of layers (for example, two layers). A TRP 2 performs modulation mapping of a second code word and performs layer mapping so as to transmit a second PDSCH by using second precoding for a second number of layers (for example, two layers).

Note that it may be defined that a plurality of PDSCHs (multi PDSCH) subjected to NCJT partially or entirely overlap in at least one of the time and frequency domains. In other words, at least one of the time and frequency resources of the first PDSCH from the first TRP and the second PDSCH from the second TRP may overlap.

It may be assumed that these first PDSCH and second PDSCH are not in a relationship of quasi-co-location (QCL) (not quasi-co-located). Reception of the multi PDSCH may be interpreted as simultaneous reception of PDSCHs that are not of a given QCL type (for example, QCL type D).

The UE receives a plurality of PDSCHs (which may be referred to as "multi PDSCH (multiple PDSCHs)") from the multi TRP, based on one or a plurality of DCIs. In the present example, the UE assumes to transmit, to different TRPs, different CSI reports related to the respective TRPs. Such CSI feedback may be referred to as separate feedback, separate CSI feedback, or the like. In the present disclosure, "separate" may be interchangeably interpreted as "independent".

Note that the CSI feedback in which the CSI report related to both of the TRPs is transmitted to one TRP may be used. Such CSI feedback may be referred to as joint feedback, joint CSI feedback, or the like.

In FIG. 2, the UE is configured to transmit a CSI report for TRP #1 to TRP #1 by using a given PUCCH (PUCCH1) and transmit a CSI report for TRP #2 to TRP #2 by using another PUCCH (PUCCH2) (separate feedback). In a case of the joint feedback, the UE transmits the CSI report for TRP #1 and the CSI report for TRP #2 to TRP #1 or #2.

According to the multi TRP scenario as described above, more flexible transmission control using a channel having satisfactory quality can be performed.

For the multi TRP transmission, CSIs for a plurality of different TRPs are usually different from each other, and thus how to perform measurement and report of the CSIs for a plurality of different TRPs has not yet been clarified. For one TRP, the channel/interference hypotheses vary depending on determination (traffic) of transmission of neighboring TRPs.

For example, a CSI report for the separate feedback (which may be referred to as a separate CSI report) may be configured using one CSI report configuration (CSI-ReportConfig) associated with one TRP.

The CSI report configuration may correspond to one interference hypothesis regarding one TRP (in other words, different CSI report configurations may be used for each TRP and for each interference hypothesis). The CSI report configuration may correspond to a plurality of interference hypotheses regarding one TRP (in other words, different CSI report configurations may be used for each TRP, and one CSI report configuration may be associated with a plurality of interference hypotheses regarding a given TRP).

For example, a CSI report for the joint feedback (which may be referred to as a joint CSI report) may be configured using one CSI report configuration (CSI-ReportConfig) associated with a plurality of TRPs.

The CSI report configuration may correspond to one interference hypothesis regarding each of a plurality of TRPs (in other words, a CSI report including a CSI of interference hypothesis #1 regarding TRP #1 and a CSI of interference hypothesis #1 regarding TRP #2 may be configured using a given CSI report configuration, and a CSI report including a CSI of interference hypothesis #2 regarding TRP #1 and a CSI of interference hypothesis #1 regarding TRP #2 may be configured using another CSI report configuration). The CSI report configuration may correspond to a plurality of interference hypotheses regarding each of a plurality of TRPs (in other words, a CSI report including two CSIs of interference hypotheses #1 and #2 regarding TRP #1 and two CSIs of interference hypotheses #3 and #4 regarding TRP #2 may be configured using one CSI report configuration).

Note that the CSI report configuration for the joint CSI report may include a resource configuration for each TRP (at least one of the resource setting for channel measurement, the CSI-IM resource setting for interference, and the NZP-CSI-RS setting for interference). The resource configuration of a given TRP may be configured being included in a resource configuration group (resource setting group).

Note that the resource configuration group may be identified with a configured resource configuration group index. The resource configuration group may be interchangeably interpreted as a report group. The resource configuration group index (which may be simply referred to as a group index) may indicate a CSI report related to a TRP (to which TRP a given CSI report (or CSI report configuration, CSI resource configuration, CSI-RS resource set, CSI-RS resource, TCI state, QCL, or the like) corresponds). For example, group index #i may correspond to TRP #i.

The CSI report configuration for the separate CSI report may be referred to as a separate CSI report configuration, a separate CSI configuration, or the like. The CSI report configuration for the joint CSI report may be referred to as a joint CSI report configuration, a joint CSI configuration, or the like.

Regarding the MTRP, it is preferable that single TRP (STRP) transmission and MTRP transmission be dynamically switched depending on a channel state or the like. For the sake thereof, the following CSIs are required:
- CSI (hereinafter also referred to as CSI_A) for the TRP1 (first TRP) assuming STRP transmission,
- CSI (hereinafter also referred to as CSI_B) for the TRP2 (second TRP) assuming STRP transmission,
- CSI (hereinafter also referred to as CSI_C) for the TRP1 with inter-TRP/beam interference from the TRP2 being taken into consideration, assuming NCJT transmission of the MTRP,
- CSI (hereinafter also referred to as CSI_D) for the TRP2 with inter-TRP/beam interference from the TRP1 being taken into consideration, assuming NCJT transmission of the MTRP.

CSI_A and CSI_B may be fed back by the separate feedback, or may be fed back by the joint feedback. In contrast, CSI_C and CSI_D may cause the following problems if being fed back by the separate feedback.

Problem 1 is that, when the network performs the NCJT transmission according to the RI and the PMI reported from the UE, a total RI (which may be interchangeably interpreted as the number of layers or a rank) from two TRPs may exceed UE capability (for example, a maximum number (for example, indicated by an RRC parameter "maxNumber-MIMO-LayersPDSCH") of spatial multiplexing layers supported for DL reception).

In this case, the network is required to acquire an appropriate RI and PMI that satisfy the UE capability for NCJT. Alternatively, UE operation (for example, to drop or not to decode the PDSCH of a part of the layers, or the like) of a case in which a total rank from the MTRP exceeds the UE capability may be defined.

Problem 2 is that, when the network performs the NCJT transmission according to the RI/PMI/CQI reported from the UE, reported inter-TRP interference may not be close to actual inter-TRP interference (in other words, a reported CSI may not be sufficiently accurate).

In this case, the network is required to acquire the CSI for NCJT that is more appropriate for a channel state.

The NR specifications defined thus far cannot sufficiently address problems 1 and 2 described above. Unless these are addressed, the CSI report cannot be appropriately performed in a case of the multi TRP, which may lead to reduction of throughput or deterioration of communication quality.

In view of this, the inventors of the present invention came up with the idea of a preferable method for measurement and report of the CSI when the multi panel/TRP is used.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted as each other.

In the present disclosure, a panel, an Uplink (UL) transmission entity, a TRP, a spatial relation, a control resource set (CORESET), a PDSCH, a code word, a base station, an antenna port of a given signal (for example, a demodulation reference signal (DMRS) port), an antenna port group of a given signal (for example, a DMRS port group), a group for multiplexing (for example, a code division multiplexing (CDM) group, a reference signal group, a CORESET group), a CORESET pool, a CW, a redundancy version (RV), and a layer (a MIMO layer, a transmission layer, a spatial layer) may be interchangeably interpreted as each other. A panel Identifier (ID) and a panel may be interchangeably interpreted as each other. In the present disclosure, a TRP ID and a TRP may be interchangeably interpreted as each other.

In the present disclosure, NCJT, NCJT using the multi TRP, the multi PDSCH using NCJT, the multi PDSCH, a plurality of PDSCHs from the multi TRP, and the like may be interchangeably interpreted as each other. Note that the multi PDSCH may mean a plurality of PDSCHs in which at least a part of time resources (for example, one symbol) overlaps, may mean a plurality of PDSCHs in which all of time resources (for example, all symbols) overlap, may mean a plurality of PDSCHS in which none of time resources overlaps, may mean a plurality of PDSCHs carrying the same TB or the same CW, or may mean a plurality of PDSCHs to which different UE beams (spatial domain reception filters, QCL parameters) are applied.

In the present disclosure, a cell, a CC, a carrier, a BWP, and a band may be interchangeably interpreted as each other.

In the present disclosure, an index, an ID, an indicator, a resource ID, and the like may be interchangeably interpreted as each other. In the present disclosure, a beam, a TCI, a TCI state, a DL TCI state, a UL TCI state, a unified TCI state, QCL, a QCL assumption, a spatial relation, spatial relation information, a precoder, and the like may be interchangeably interpreted as each other.

In the present disclosure, a list, a group, a set, a subset, a cluster, and the like may be interchangeably interpreted as each other.

In the present disclosure, a TRP index, a CORESET pool index (CORESETPoolIndex), a pool index, a group index, a CSI report setting group index, a CSI report group index, a CSI report configuration index, a CSI report setting group index, and a resource setting group index may be interchangeably interpreted as each other.

In the present disclosure, resource setting for channel measurement, a resource for channel measurement, and resourcesForChannelMeasurement may be interchangeably interpreted as each other. In the present disclosure, CSI-IM resource setting for interference, a resource for CSI-IM based interference measurement, csi-IM-ResourceForInterference, and a resource for interference measurement may be interchangeably interpreted as each other. In the present disclosure, NZP-CSI-RS resource setting for interference, a resource for NZP-CSI-RS based interference measurement, nzp-CSI-RS-ResourcesForInterference, and a resource for interference measurement may be interchangeably interpreted as each other.

In the present disclosure, a CSI report, a CSI report configuration, a CSI configuration, a resource configuration, and the like may be interchangeably interpreted as each other.

(Radio Communication Method)

First Embodiment

A first embodiment is an embodiment to particularly address problem 1 described above.

The UE may be simultaneously configured with the CSI report configuration for the separate CSI report (separate CSI report configuration) and the CSI report configuration for the joint CSI report (joint CSI report configuration). Note that the UE may be configured with only the CSI report configuration for the separate CSI report, or may be configured with only the CSI report configuration for the joint CSI report.

Note that the separate CSI report may be used for reporting at least one of CSI_A and CSI_B described above. The joint CSI report may be used for reporting at least one of CSI_A and CSI_B described above.

The joint CSI report may include a plurality of CSIs including a first CSI for a first TRP and a second CSI for a second TRP. The UE may assume that a first rank indicated by the first CSI (RI thereof) and a second rank indicated by the second CSI (RI thereof) satisfy at least one of the following (are subjected to at least one restriction of the following):

(1) A total rank of the first rank and the second rank does not exceed a rank indicated by the UE capability,
(2) Each of the first rank and the second rank does not exceed a value obtained by dividing the maximum number of supported spatial multiplexing layers by N (for example, N is the number of configured TRPs, the number of CORESET pools, or the like),
(3) Each of the first rank and the second rank does not exceed a value based on higher layer signaling (for example, RRC, MAC CE, or the like).

The UE capability in (1) above may be a capability (maxNumberMIMO-LayersPDSCH) of the maximum number of spatial multiplexing layers supported for DL reception in Rel-15 NR. When a capability (which may be indicated by, for example, an RRC parameter "maxNumberMIMO-LayersPDSCHperTRP") of the maximum number of spatial multiplexing layers supported for DL reception for each TRP is defined, the "rank indicated by the UE capability" in (1) above may be interpreted as "N (N is the same as that in (2) above) times a rank indicated by the capability of the maximum number of spatial multiplexing layers supported for DL reception for each TRP".

Regarding (2) above, when the capability of the maximum number of spatial multiplexing layers supported for DL reception for each TRP is defined, the "value obtained by dividing the maximum number of supported spatial multiplexing layers by N" in (1) above may be interpreted as the maximum number of spatial multiplexing layers supported for DL reception for each TRP.

Regarding (3) above, the value based on higher layer signaling may be one value of the highest ranks in which report is permitted being common to a plurality of CSIs (plurality of TRPs) in the CSI report (in other words, different values are referred to by the first rank and the second rank), or may be a set of the highest ranks in which report regarding each of a plurality of CSIs (TRPs) is permitted (different values are referred to by the first rank and the second rank).

Figure 3:
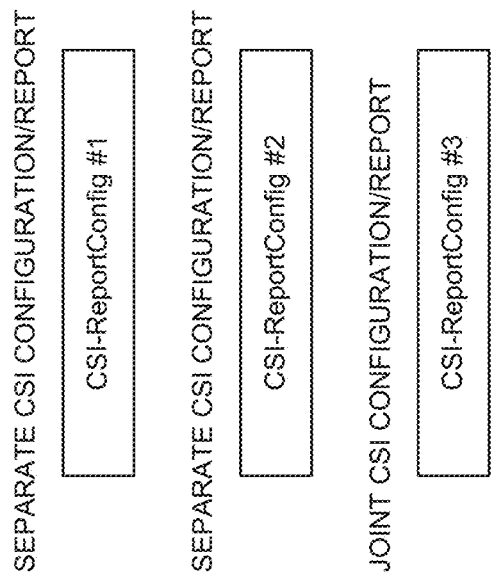
FIG. 3 is a diagram to show an example of the CSI report configurations according to a first embodiment.

FIG. 3 is a diagram to show an example of the CSI report configurations according to the first embodiment. In the present example, the UE is simultaneously configured with CSI report configurations #1 and #2 related to the separate CSI report and CSI report configuration #3 related to the joint CSI report.

For example, CSI report configuration #1 may correspond to CSI_A for the TRP1, and CSI report configuration #2 may correspond to CSI_B for the TRP2. CSI report configuration #3 may correspond to CSI_C and CSI_D for the MTRP. Note that CSI_C and CSI_D follow at least one restriction of (1) to (3) above.

{Whether CSI Report Configuration is for Separate or for Joint}

Figure 4:
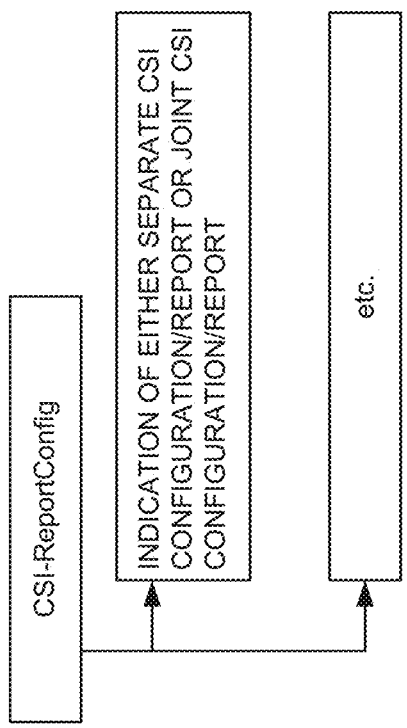
FIG. 4 is a diagram to show an example of an RRC parameter indicating a CSI feedback type indication.

Whether the CSI report configuration is the separate CSI configuration or the joint CSI configuration (which may be referred to as a CSI feedback type indication) may be explicitly configured by higher layer signaling (for example, an RRC parameter). FIG. 4 is a diagram to show an example of an RRC parameter indicating the CSI feedback type indication. In the present example, the CSI report configuration (CSI-ReportConfig) at least includes an RRC parameter indicating the CSI feedback type indication.

When the CSI report configuration does not include the CSI feedback type indication, the UE may assume that a default feedback type is used regarding the CSI report configuration. The default feedback type may be the separate CSI configuration, may be the joint CSI configuration, or may be determined based on another parameter in the CSI report configuration as will be described later.

Whether the CSI report configuration is the separate CSI configuration or the joint CSI configuration may be implicitly reported by another RRC parameter.

For example, when up to one CMR (resources ForChannelMeasurement), up to one ZP-IMR (csi-IM-ResourcesForInterference), and up to one NZP-IMR (nzp-CSI-RS-ResourcesForInterference) are included in the CSI report configuration as shown in FIG. 1, the UE may determine that the CSI report configuration is the separate CSI configuration. The UE may assume that only one CSI is included in the CSI report based on the CSI report configuration.

Figure 5:
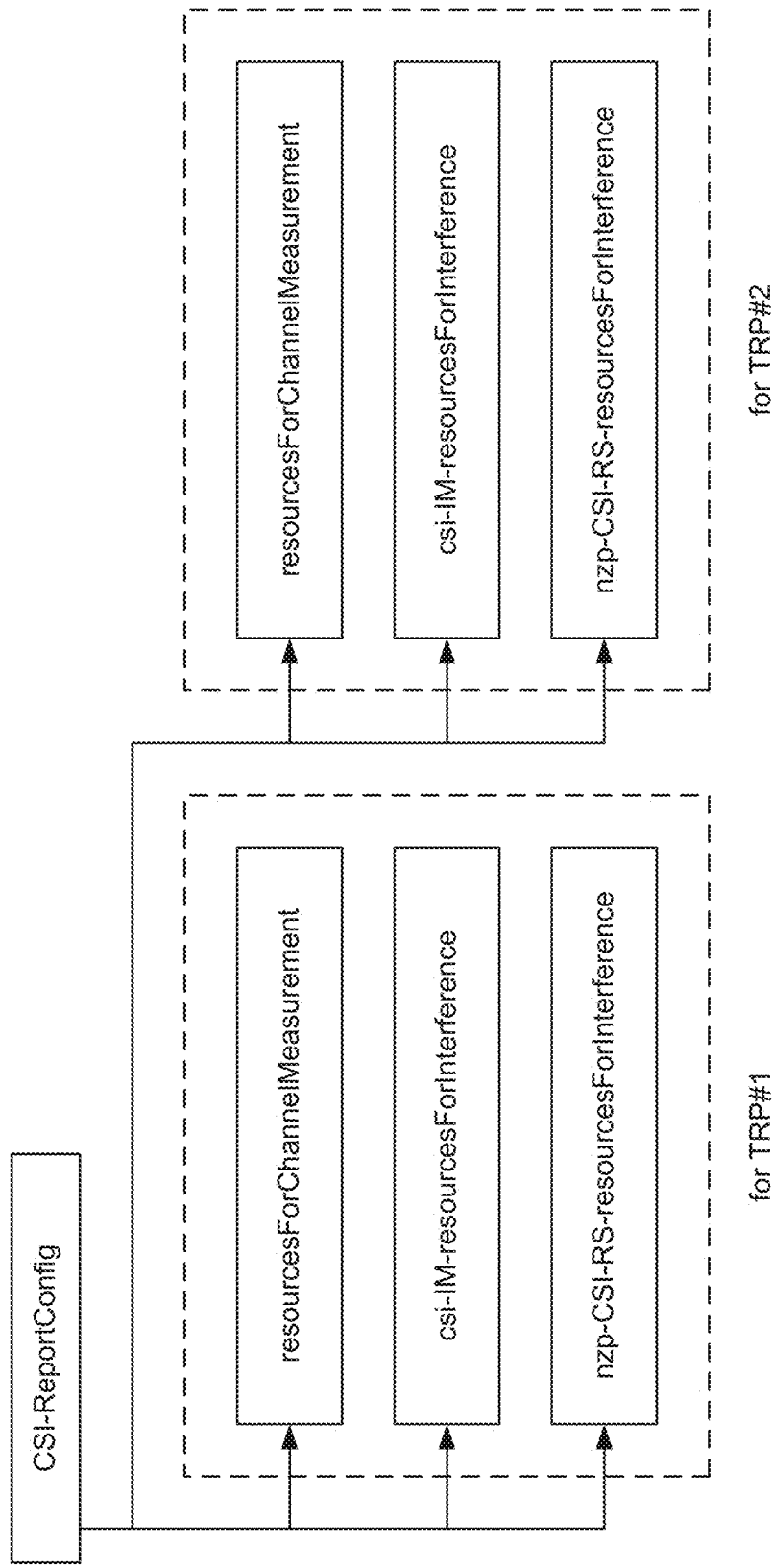
FIG. 5 is a diagram to show an example of a joint CSI configuration.

When at least one of a plurality of CMRs (resources ForChannelMeasurement), a plurality of ZP-IMRs (csi-IM-ResourcesForInterference), and a plurality of NZP-IMRs (nzp-CSI-RS-ResourcesForInterference) is included in the CSI report configuration as shown in FIG. 5, the UE may determine that the CSI report configuration is the joint CSI configuration. The UE may assume that a plurality of CSIs are included in the CSI report based on the CSI report configuration.

Note that, as shown in FIG. 5, a set of the CMR, the ZP-IMR, and the NZP-IMR may be configured for each TRP. A plurality of different sets may be configured being associated with different respective resource configuration groups.

According to the first embodiment described in the above, for example, the UE can report a plurality of RIs preferable for NCJT transmission by using the joint CSI report.

Second Embodiment

A second embodiment is an embodiment to particularly address problem 2 described above.

In the second embodiment, regarding the joint CSI report, the CMR for a given CSI (TRP) corresponds to the IMR for another CSI (TRP). According to the configuration, it is expected that two CSIs included in the joint CSI report for NCJT transmission is well close to actual inter-TRP interference (sufficiently accurate for direct scheduling). Further CSI update is not required by network implementation.

{Explicit IMR Configuration}

Regarding a given CSI report configuration, the UE may assume that the CMR of one resource configuration group (resource specified by resourcesForChannelMeasurement) is included in (or is the same as) the NZP-IMR in another resource configuration group (resource specified by nzp-CSI-RS-ResourcesForInterference).

Figure 6:
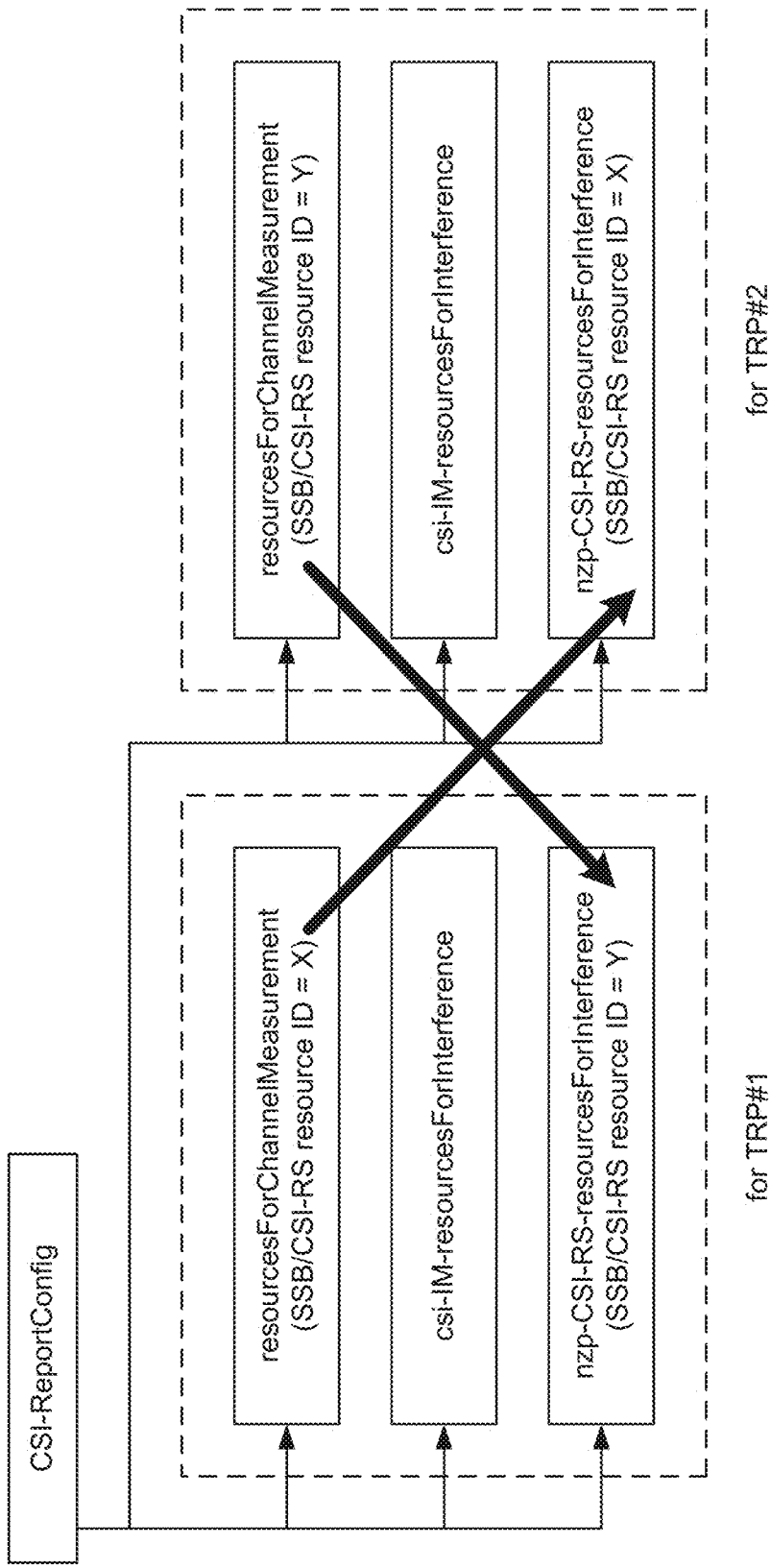
FIG. 6 is a diagram to show an example of the CSI report configuration according to a second embodiment.

FIG. 6 is a diagram to show an example of the CSI report configuration according to the second embodiment. FIG. 6 is similar to FIG. 5, and thus overlapping description is not given.

In the present example, when SSB/CSI-RS ID=X (X is an integer, for example) is configured regarding the CMR for TRP #1 (or resource configuration group #1), it is indicated that the same SSB/CSI-RS ID=X is configured regarding the NZP-IMR for TRP #2 (or resource configuration group #2).

In the present example, when SSB/CSI-RS ID=Y (Y is an integer, for example) is configured regarding the CMR for TRP #2, it is indicated that the same SSB/CSI-RS ID=Y is configured regarding the NZP-IMR for TRP #1.

Note that the ZP-IMR may be configured individually for each TRP as shown in FIG. 6.

Figure 7:
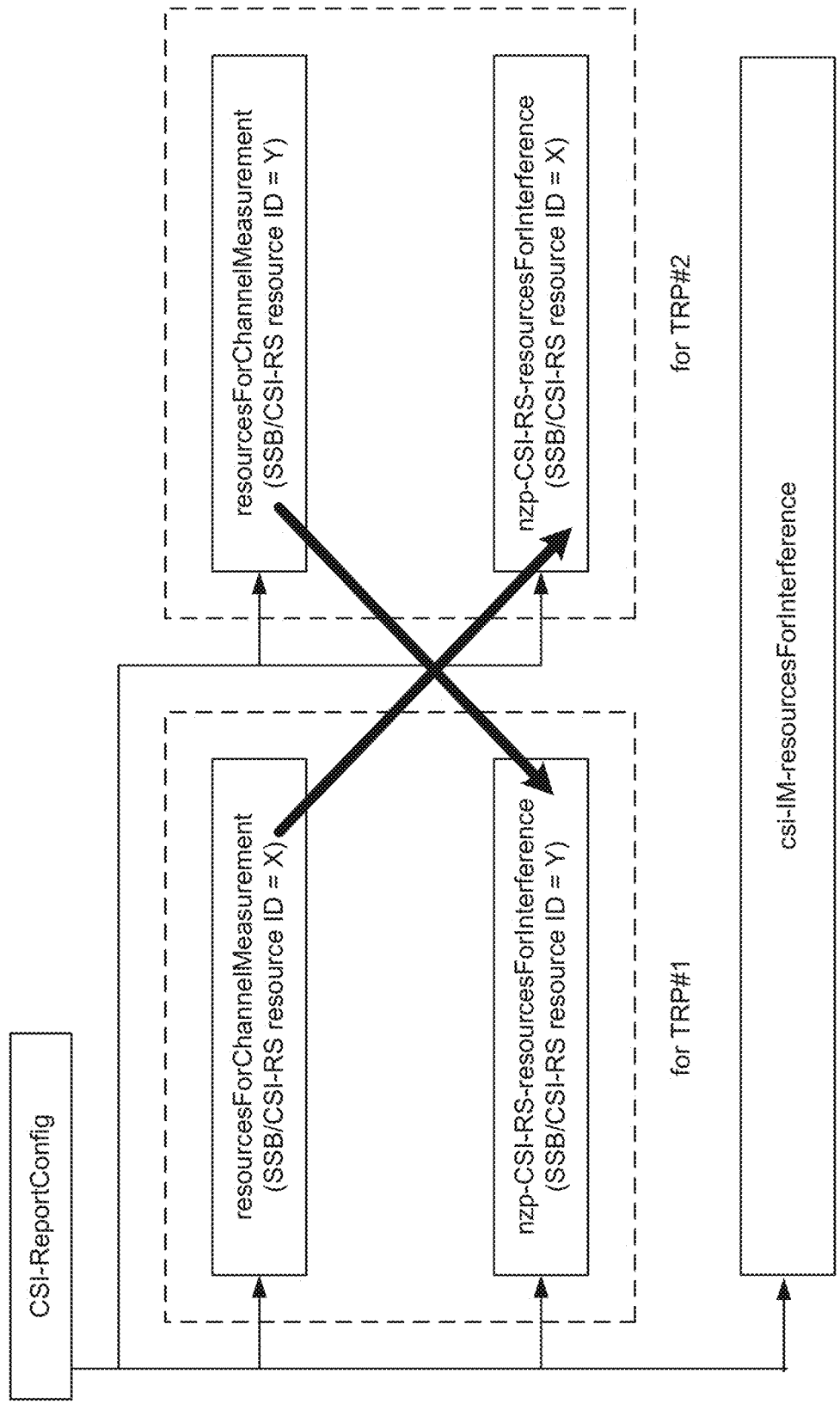
FIG. 7 is a diagram to show an example of the CSI report configuration according to the second embodiment.

FIG. 7 is a diagram to show an example of the CSI report configuration according to the second embodiment. FIG. 7 is similar to FIG. 6, and thus overlapping description is not given. FIG. 7 is different from FIG. 6 in that the ZP-IMR is configured to be common to (shared by) two TRPs.

Note that, when a plurality of SSB/CSI-RS IDs are configured (a plurality of CMRs are configured) as the CMR for TRP #1 (#2), a plurality of SSB/CSI-RS IDs may be configured as the NZP-IMR for TRP #2 (#1) in the same order. For example, an i-th list/ID/set regarding the CMR of a given TRP may be mutually mapped with an i-th list/ID/set regarding the IMR of another TRP.

Note that mapping (correspondence) between the list/ID/set regarding the CMR of a given TRP and the i-th list/ID/set regarding the IMR of another TRP may be configured using higher layer signaling, or may be determined in a specification in advance.

{Implicit IMR Configuration}

The UE may assume that the explicit IMR configuration regarding inter-TRP interference is not performed regarding a given CSI report configuration (joint CSI configuration). In this case, in a specification, assumption of an additional IMR in a case in which the joint CSI configuration is configured may be defined.

For example, it may be assumed that, in the joint CSI configuration, in addition to or instead of the explicit ZP-IMR/NZP-IMR, the CMR for a given TRP (resource indicated by specified) is included in (or is the same as) an additional NZP-IMR for another TRP. Here, the additional NZP-IMR for another TRP is not explicitly configured.

Information related to the additional NZP-IMR may be determined in a specification in advance, or may be reported to the UE using at least one of RRC, MAC CE, and DCI.

Figure 8:
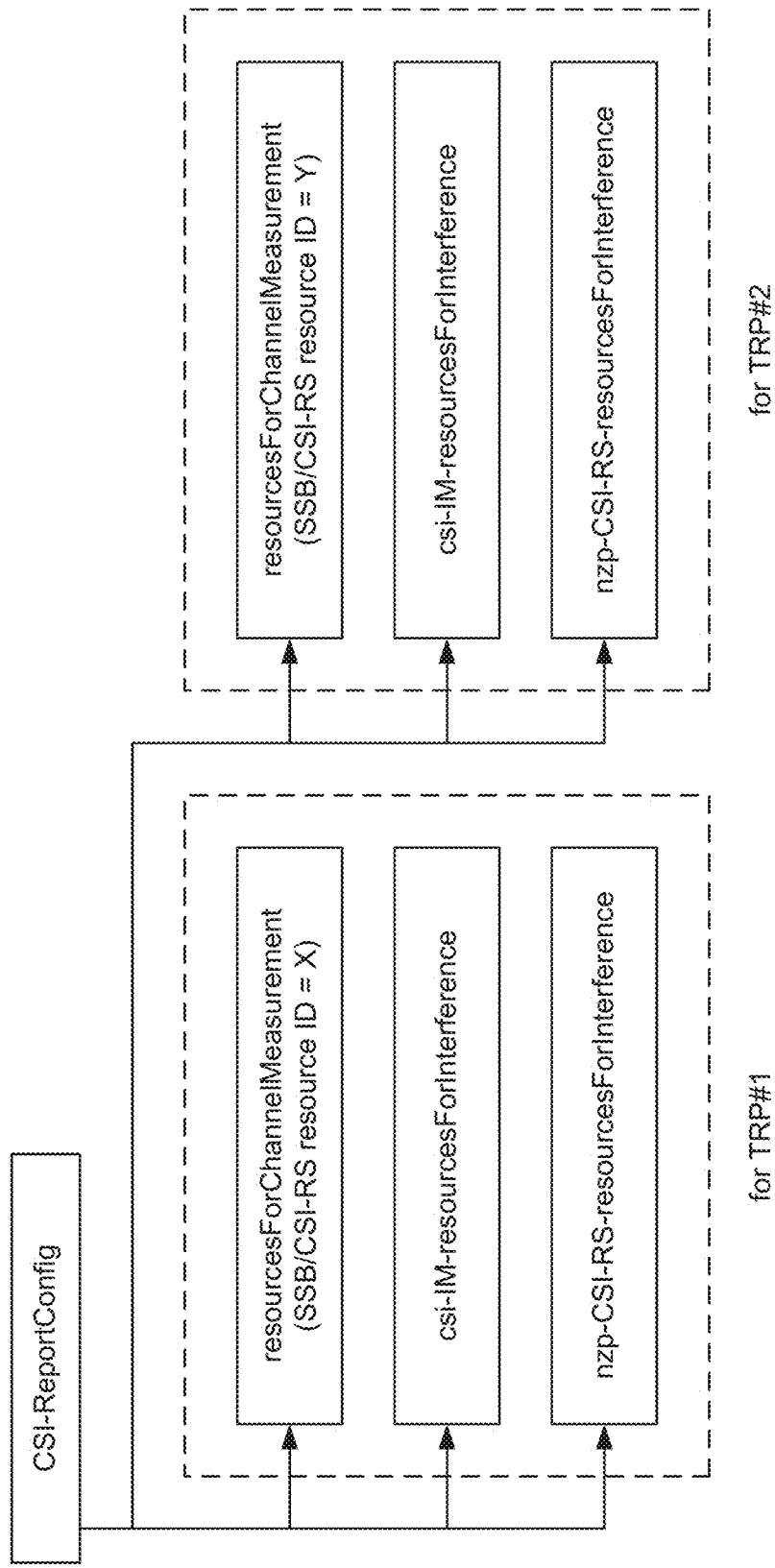
FIG. 8 is a diagram to show an example of the CSI report configuration according to the second embodiment.

FIG. 8 is a diagram to show an example of the CSI report configuration according to the second embodiment. FIG. 8 is similar to FIG. 6, and thus overlapping description is not given. FIG. 8 is different from FIG. 6 in that SSB/CSI-RS ID=Y is not explicitly configured regarding the NZP-IMR of TRP #1 and SSB/CSI-RS ID=X is not explicitly configured regarding the NZP-IMR of TRP #2.

Even though there is no explicit NZP-IMR configuration, the UE may assume that SSB/CSI-RS ID=Y corresponding to the CMR of TRP #2 corresponds to the NZP-IMR of TRP #1, and SSB/CSI-RS ID=X corresponding to the CMR of TRP #1 corresponds to the NZP-IMR of TRP #2. The UE may perform channel/interference measurement or the like based on these assumptions, and perform the joint CSI report.

Figure 9:
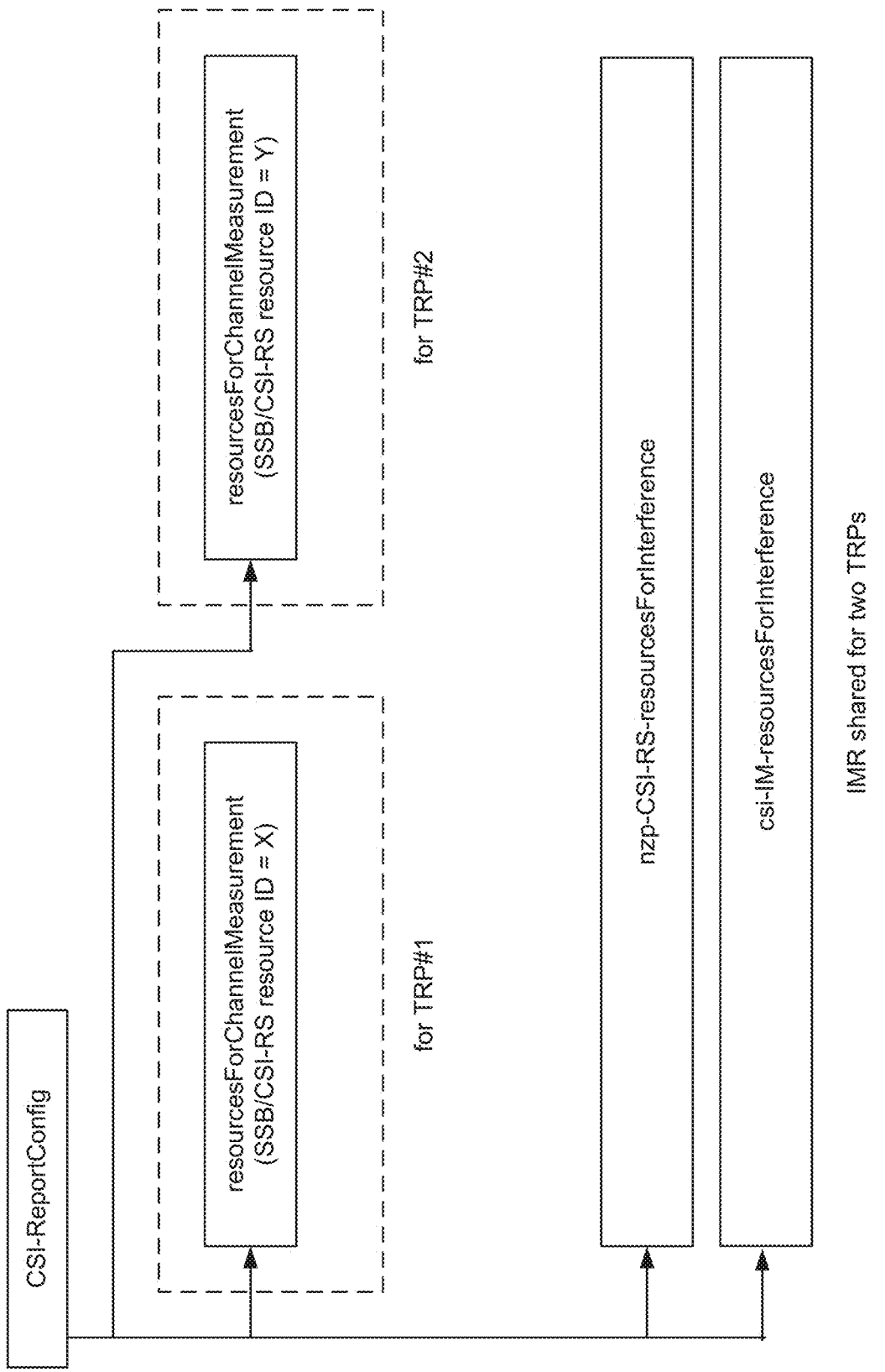
FIG. 9 is a diagram to show an example of the CSI report configuration according to the second embodiment.

FIG. 9 is a diagram to show an example of the CSI report configuration according to the second embodiment. FIG. 9 is similar to FIG. 8, and thus overlapping description is not given. FIG. 9 is different from FIG. 8 in that the ZP-IMR and the NZP-IMR are configured to be common to (shared by) two TRPs.

The UE may use, as the NZP-IMR of TRP #1, the NZP-IMR configured to be common and SSB/CSI-RS ID=Y corresponding to the CMR of TRP #2. The UE may use, as the NZP-IMR of TRP #2, the NZP-IMR configured to be common and SSB/CSI-RS ID=X corresponding to the CMR of TRP #1.

According to the second embodiment described in the above, for example, with the use of the joint CSI report, the UE can report the CSI for NCJT transmission with inter-TRP interference being appropriately taken into consideration.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
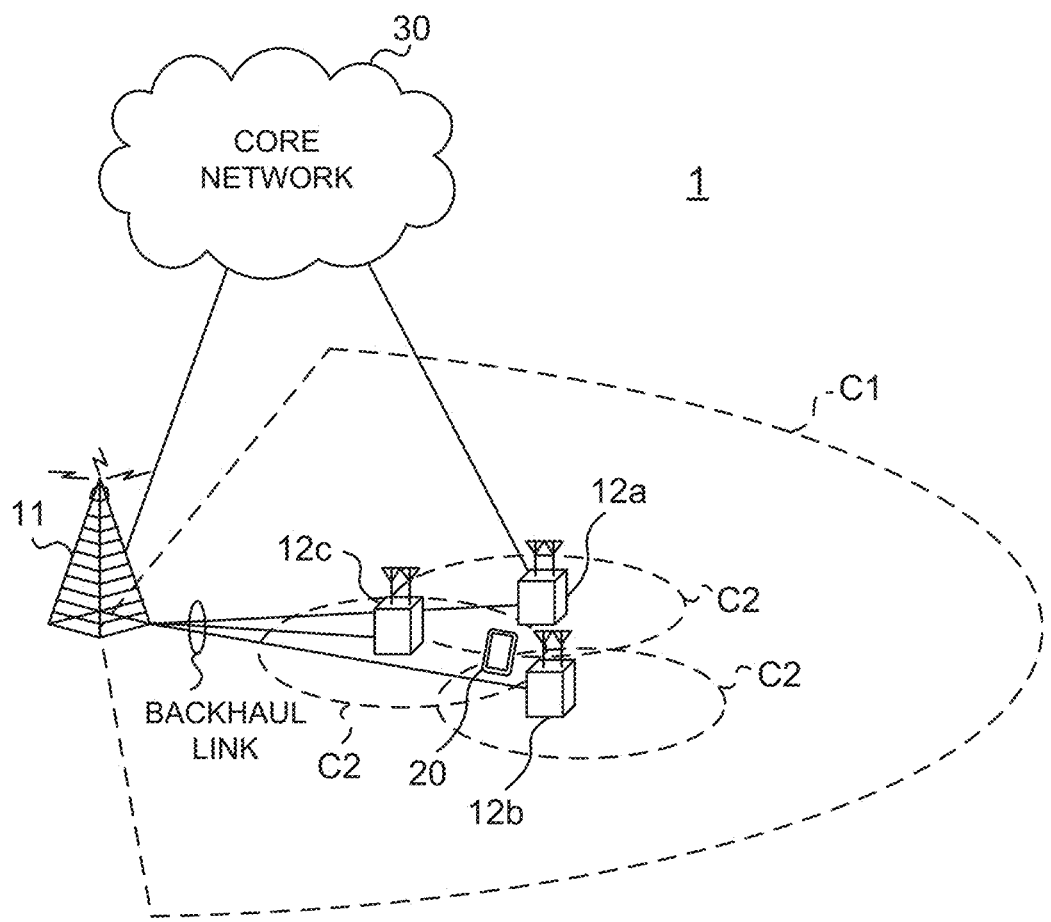
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHZ). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-S-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
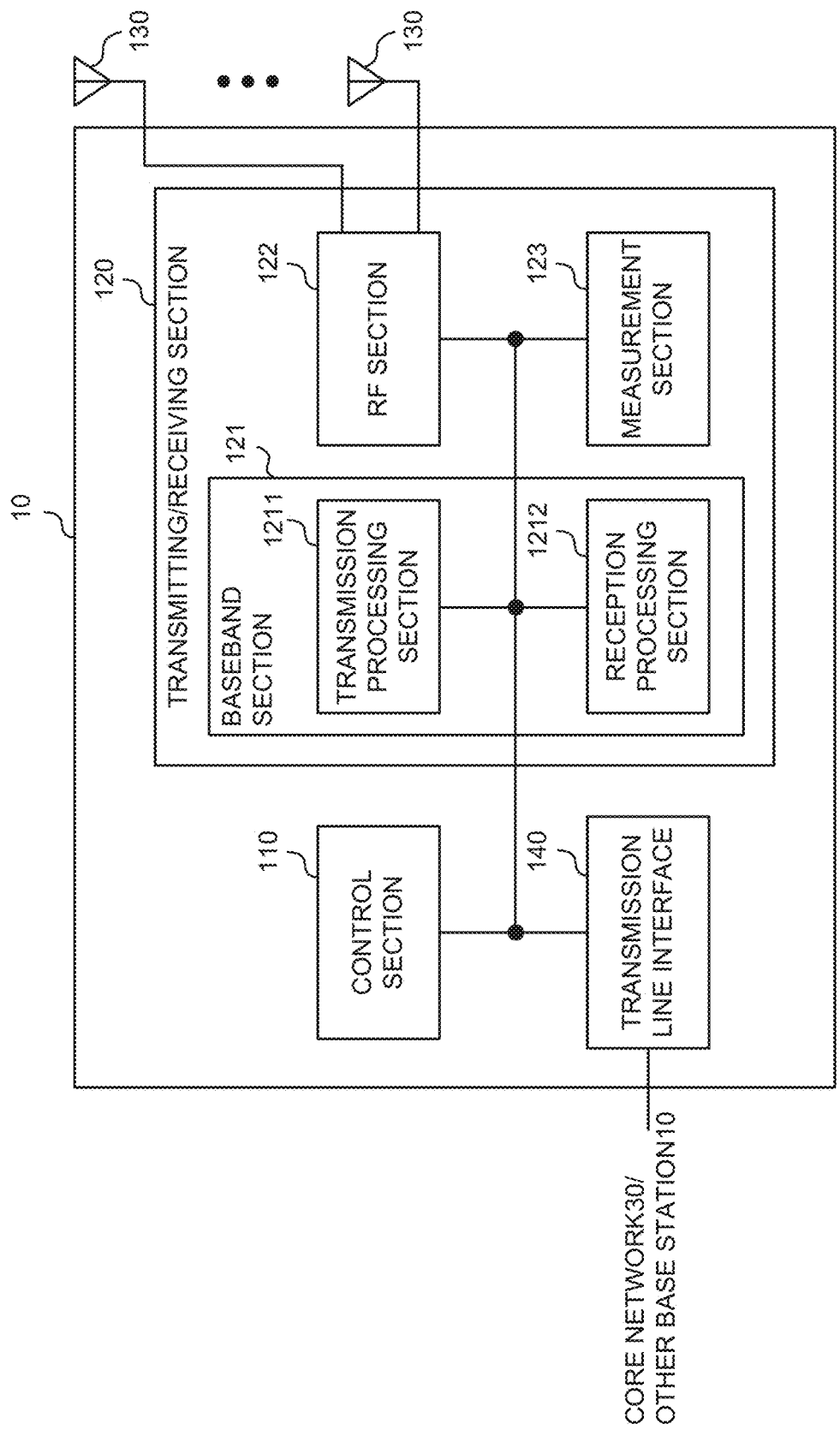
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to the user terminal 20, configuration information for a joint CSI report including first channel state information (CSI) and second CSI.

The control section 110 may assume that a first rank indicated by the first CSI and a second rank indicated by the second CSI are subjected to a given restriction, and receive the joint CSI report created by the terminal.

(User Terminal)

Figure 12:
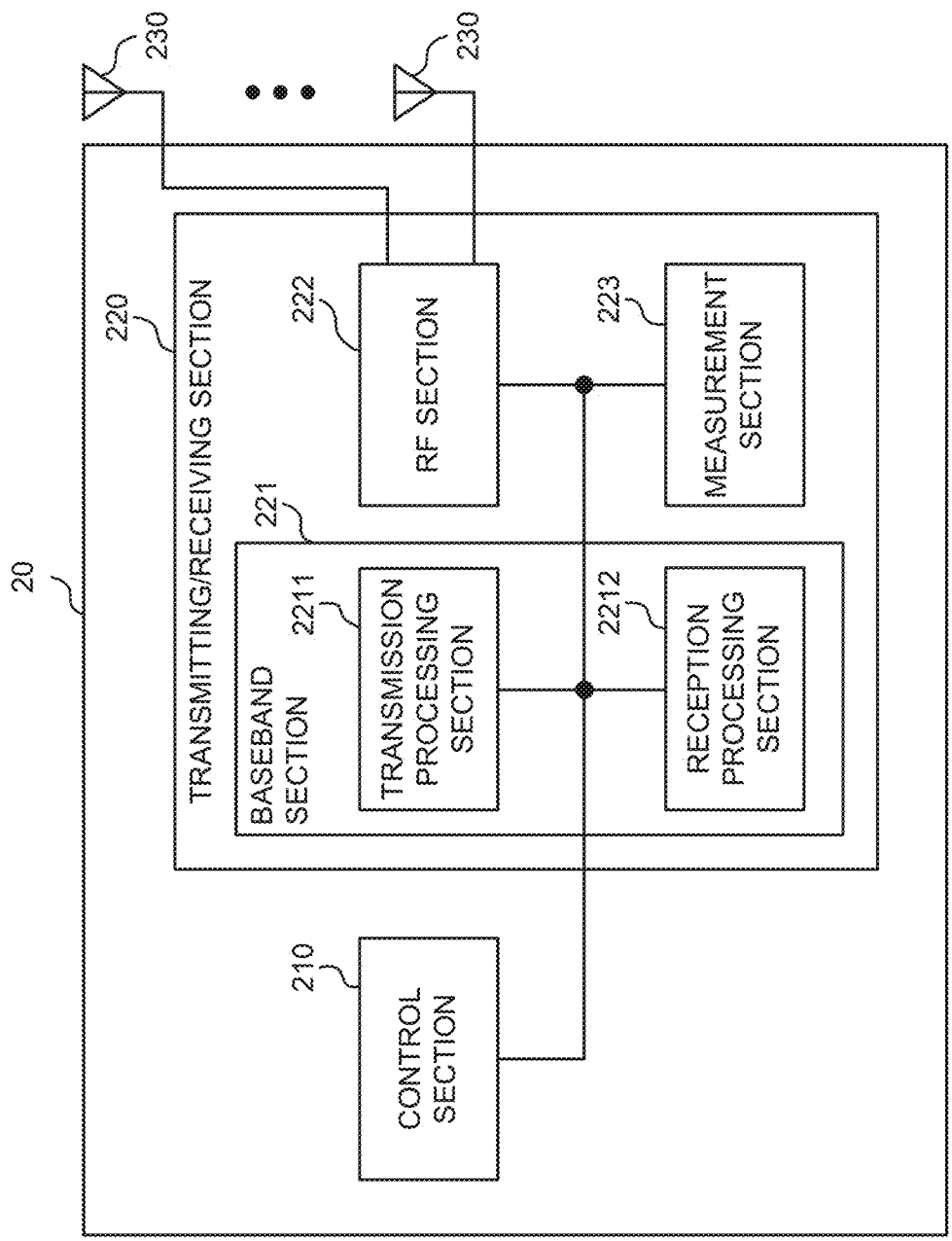
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the control section 210 may assume that a first rank indicated by first channel state information (CSI) and a second rank indicated by second CSI are subjected to a given restriction, and control creation (generation) of a joint CSI report including the first CSI and the second CSI.

The transmitting/receiving section 220 may transmit the joint CSI report.

The control section 210 may assume that a total rank of the first rank and the second rank does not exceed a rank indicated by UE capability.

The control section 210 may control the creation of the joint CSI report when a CSI report configuration including information indicating the joint CSI report (CSI feedback type indication indicating the joint CSI report) or a CSI report configuration not indicating a separate CSI report is configured.

The control section 210 may assume that a channel measurement resource (CMR) for the first CSI corresponds to an interference measurement resource (IMR, for example, at least one of NZP-IMR and ZP-IMR) for the second CSI, and control the creation of the joint CSI report.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
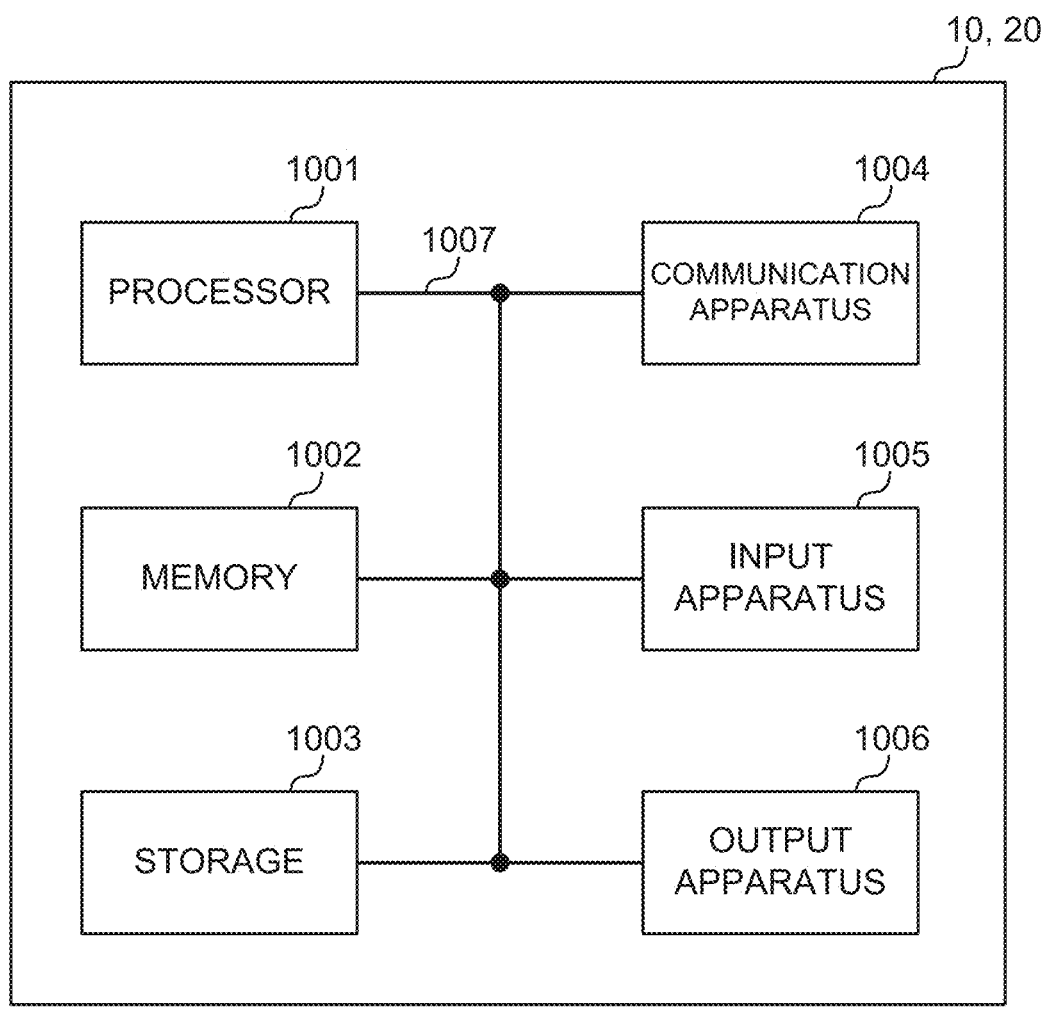
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that, for a plurality of physical downlink shared channels (PDSCHs) transmitted from a plurality of transmission reception points (TRPs), respectively, controls transmission of capability information for indicating a first maximum number regarding a number of layers per PDSCH and a second maximum number regarding a total number of layers of the plurality of PDSCHs; and
    a receiver that receives the plurality of PDSCHs,
    wherein the processor controls reporting of a single channel state information (CSI) for the plurality of TRPs, the single CSI indicating a first rank and a second rank that are determined according to a set of ranks based on higher layer signaling.

2. A radio communication method for a terminal, comprising:
    for a plurality of physical downlink shared channels (PDSCHs) transmitted from a plurality of transmission reception points (TRPs), respectively, controlling transmission of capability information for indicating a first maximum number regarding a number of layers per PDSCH and a second maximum number regarding a total number of layers of the plurality of PDSCHs;
    receiving the plurality of PDSCHs; and
    controlling reporting of a single channel state information (CSI) for the plurality of TRPs, the single CSI indicating a first rank and a second rank that are determined according to a set of ranks based on higher layer signaling.

3. A base station comprising:
    a processor that, for a plurality of physical downlink shared channels (PDSCHs) transmitted from a plurality of transmission reception points (TRPs), respectively, controls reception of capability information for indicating a first maximum number regarding a number of layers per PDSCH and a second maximum number regarding a total number of layers of the plurality of PDSCHs; and
    a transmitter that transmits the plurality of PDSCHS,
    wherein the processor controls reception of a single channel state information (CSI) for the plurality of TRPs, the single CSI indicating a first rank and a second rank that are determined according to a set of ranks based on higher layer signaling.

4. A system comprising a terminal and a base station, wherein
    the terminal comprises:
        a processor that, for a plurality of physical downlink shared channels (PDSCHs) transmitted from a plurality of transmission reception points (TRPs), respectively, controls transmission of capability information for indicating a first maximum number regarding a number of layers per PDSCH and a second maximum number regarding a total number of layers of the plurality of PDSCHs; and
        a receiver that receives the plurality of PDSCHs, and
    the base station comprises:
        a transmitter that transmits the plurality of PDSCHs,
    wherein the processor of the terminal controls reporting of a single channel state information (CSI) for the plurality of TRPs, the single CSI indicating a first rank and a second rank that are determined according to a set of ranks based on higher layer signaling.

* * * * *